(12) United States Patent
Takeshima et al.

(10) Patent No.: US 11,722,040 B2
(45) Date of Patent: Aug. 8, 2023

(54) METHOD OF MANUFACTURING ROTOR

(71) Applicant: TOYOTA JIDOSHA KABUSHIKI KAISHA, Toyota (JP)

(72) Inventors: Kenta Takeshima, Okazaki (JP); Takashi Yamamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/708,298

(22) Filed: Mar. 30, 2022

(65) Prior Publication Data

US 2022/0337139 A1 Oct. 20, 2022

(30) Foreign Application Priority Data

Apr. 16, 2021 (JP) .................. 2021-069555

(51) Int. Cl.
| | |
|---|---|
| *H02K 15/03* | (2006.01) |
| *H02K 15/12* | (2006.01) |
| *H02K 1/28* | (2006.01) |
| *H02K 1/276* | (2022.01) |

(52) U.S. Cl.
CPC ............ *H02K 15/03* (2013.01); *H02K 1/276* (2013.01); *H02K 1/28* (2013.01); *H02K 15/12* (2013.01); *Y10T 29/49012* (2015.01)

(58) Field of Classification Search
CPC ........ H02K 15/03; H02K 15/12; H02K 1/276; H02K 1/28; H02K 1/27; H02K 21/14; Y10T 29/49012; Y10T 29/49009; Y10T 29/49075; Y10T 29/49078; Y10T 29/53143

USPC ...... 29/598, 596, 602.1, 604, 607, 609, 732, 29/738
See application file for complete search history.

(56) References Cited

U.S. PATENT DOCUMENTS

| | | | | |
|---|---|---|---|---|
| 5,824,254 A | * | 10/1998 | Dehennau | ........... B29C 45/5605 264/312 |
| 10,498,202 B2 | * | 12/2019 | Yokota | ................... H02K 15/12 |

FOREIGN PATENT DOCUMENTS

| | | | | |
|---|---|---|---|---|
| JP | 2006-311782 A | | 11/2006 | |
| JP | 2015-035888 A | | 2/2015 | |
| JP | 2019075877 | * | 10/2017 | ............. H02K 11/21 |
| JP | 2020141552 | * | 7/2019 | ............... H02K 1/27 |

* cited by examiner

*Primary Examiner* — Thiem D Phan
(74) *Attorney, Agent, or Firm* — Finnegan, Henderson, Farabow, Garrett & Dunner, LLP

(57) ABSTRACT

A manufacturing method of a rotor may be provided with: arranging a magnet and a thermoplastic in a magnet fixing portion of a rotor core including a laminate in which a plurality of metal plates is laminated, the magnet fixing portion including a hole and/or a trench provided in the rotor core and extending along a lamination direction of the laminate; heating the rotor core while rotating the rotor core around a center axis of the rotor core, with the center axis intersecting a vertical direction; and cooling the rotor core to fix the magnet to the rotor core via the thermoplastic while rotating the rotor core around the center axis, with the center axis intersecting the vertical direction.

3 Claims, 5 Drawing Sheets

METHOD OF MANUFACTURING ROTOR

CROSS-REFERENCE TO RELATED APPLICATION

This application claims priority to Japanese Patent Application No. 2021-069555, filed on Apr. 16, 2021, the entire contents of which are incorporated herein by reference.

TECHNICAL FIELD

The art disclosed herein relates to a method of manufacturing a rotor.

BACKGROUND

A method of manufacturing a rotor described in Japanese Patent Application Publication No. 2006-311782 includes a step of fixing a magnet to a rotor core. The rotor core includes a laminate in which a plurality of metal plates is laminated. A magnet fixing portion composed of a hole extending along a lamination direction is defined on the laminate. In this manufacturing method, the magnet and an adhesive sheet are arranged inside the magnet fixing portion. Then, the adhesive sheet is hardened by heating the rotor core. The magnet is thereby fixed inside the magnet fixing portion. In Japanese Patent Application Publication No. 2006-311782, the magnet fixing portion is composed of the hole defined on the laminate, however, a rotor in which its magnet fixing portion is composed of a trench defined on the laminate also exists.

SUMMARY

Improvement in fixation strength of a magnet onto a rotor core is desired to realize high-speed rotation of a rotor. Thus, the description herein provides an art configured to fix a magnet to a rotor core with high strength.

The present teachings disclose a manufacturing method of a rotor, and the method may comprise: arranging a magnet and a thermoplastic in a magnet fixing portion of a rotor core comprising a laminate in which a plurality of metal plates is laminated, the magnet fixing portion comprising a hole and/or a trench that are provided in the rotor core and extending along a lamination direction of the laminate; heating the rotor core while rotating the rotor core around a center axis of the rotor core with the center axis intersecting a vertical direction; and cooling the rotor core to fix the magnet to the rotor core via the thermoplastic while rotating the rotor core around the center axis with the center axis intersecting the vertical direction.

In this manufacturing method, the heating of the rotor core is carried out after having arranged the magnet and the thermoplastic in the magnet fixing portion. The thermoplastic is softened when the rotor core is heated. As such, in the heating of the rotor core, the softened thermoplastic flows inside the magnet fixing portion. Since the heating of the rotor core is carried out while rotating the rotor core around the center axis with this center axis of the rotor core intersecting the vertical direction, a direction of gravity applied to the thermoplastic thereby changes during the heating of the rotor core. As a result, the thermoplastic flows in a complicated pattern in a region between the magnet and the rotor core. Due to this, adhesion of the thermoplastic onto the magnet and the rotor core can be improved. After the above, the cooling of the rotor core is carried out while rotating the rotor core around the center axis with this center axis of the rotor core intersecting the vertical direction. Due to this, the thermoplastic hardens in a state of firmly adhering to the magnet and the rotor core with high adhesion. Thus, the magnet can be fixed to the rotor core with high strength.

DETAILED DESCRIPTION

In a manufacturing method according to an example disclosed herein, in the heating of the rotor core, a temperature of the rotor core may be controlled to be higher than a softening temperature of the thermoplastic.

In the description herein, the softening temperature means a temperature at which the thermoplastic softens and becomes deformable. The softening temperature may be a glass transition point.

In a manufacturing method according to an example disclosed herein, in the heating of the rotor core, the temperature of the rotor core may be controlled to be lower than a temperature 50 degrees Celsius higher than the softening temperature of the thermoplastic.

According to this configuration, viscosity of the thermoplastic can be suppressed from decreasing significantly. Thus, the thermoplastic can be suppressed from leaking out from the magnet fixing portion.

In a manufacturing method according to an example disclosed herein, concave portions extending along borders between the plurality of metal plates may be defined on an inner surface of the magnet fixing portion.

According to this configuration, the thermoplastic enters into the concave portions, thus the magnet can be fixed to the rotor core with improved strength due to an anchoring effect.

Figure 1:
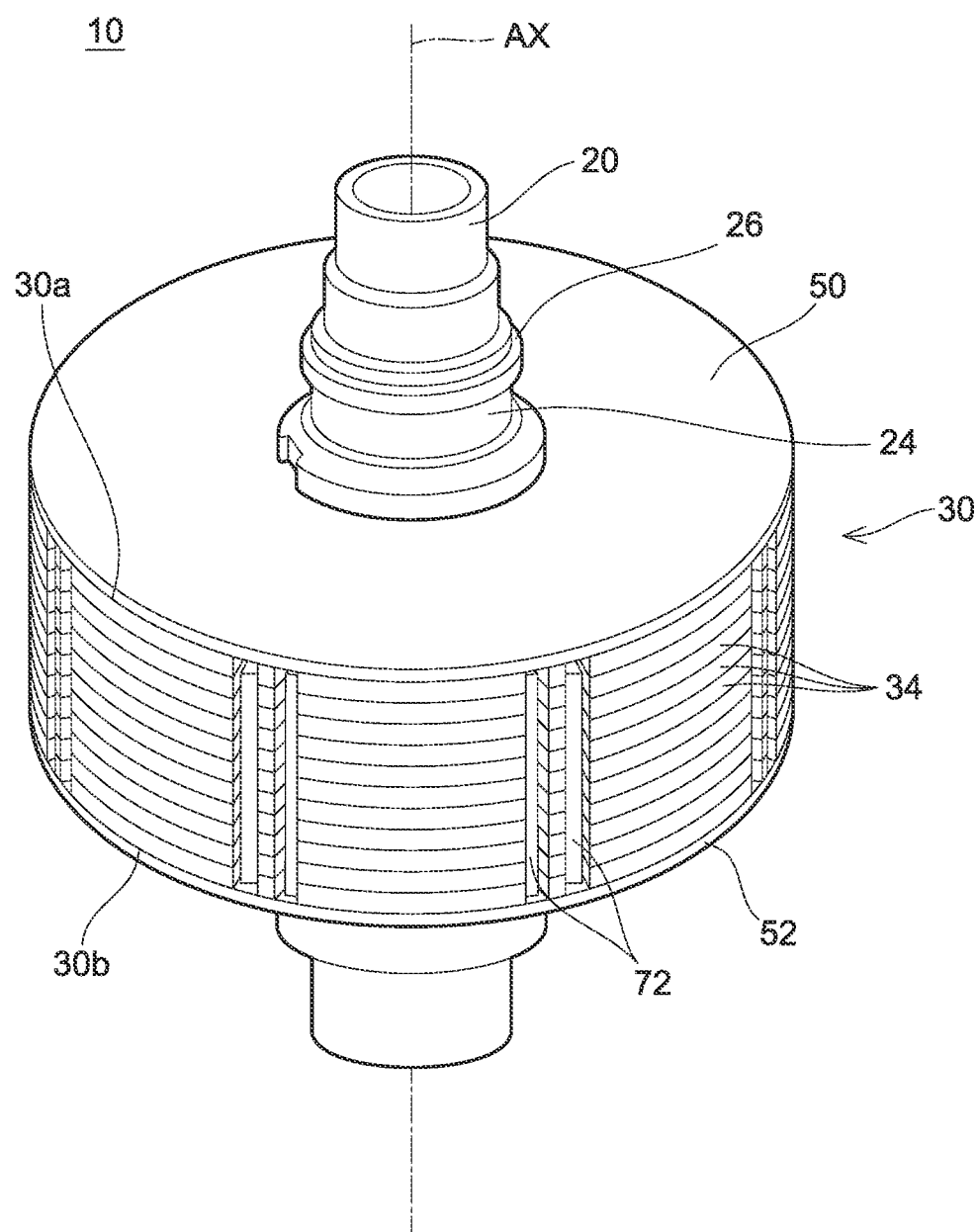
FIG. 1 is a perspective view of a rotor 10.

A rotor 10 shown in FIG. 1 is used by being incorporated into a motor (not shown) that is mounted in a vehicle such as an electric vehicle and a hybrid vehicle. When electric power is supplied to the motor, the rotor 10 thereby rotates. The rotor 10 includes a cylindrical rotor core 30. A center axis AX in FIG. 1 indicates a center axis of the rotor core 30. The center axis AX of the rotor core 30 coincides with a rotation axis of the rotor 10. That is, the rotor 10 is configured to rotate with the center axis AX as a rotation center. As shown in FIG. 1, the rotor 10 includes a shaft 20, a first end plate 50, and a second end plate 52.

Figure 2:
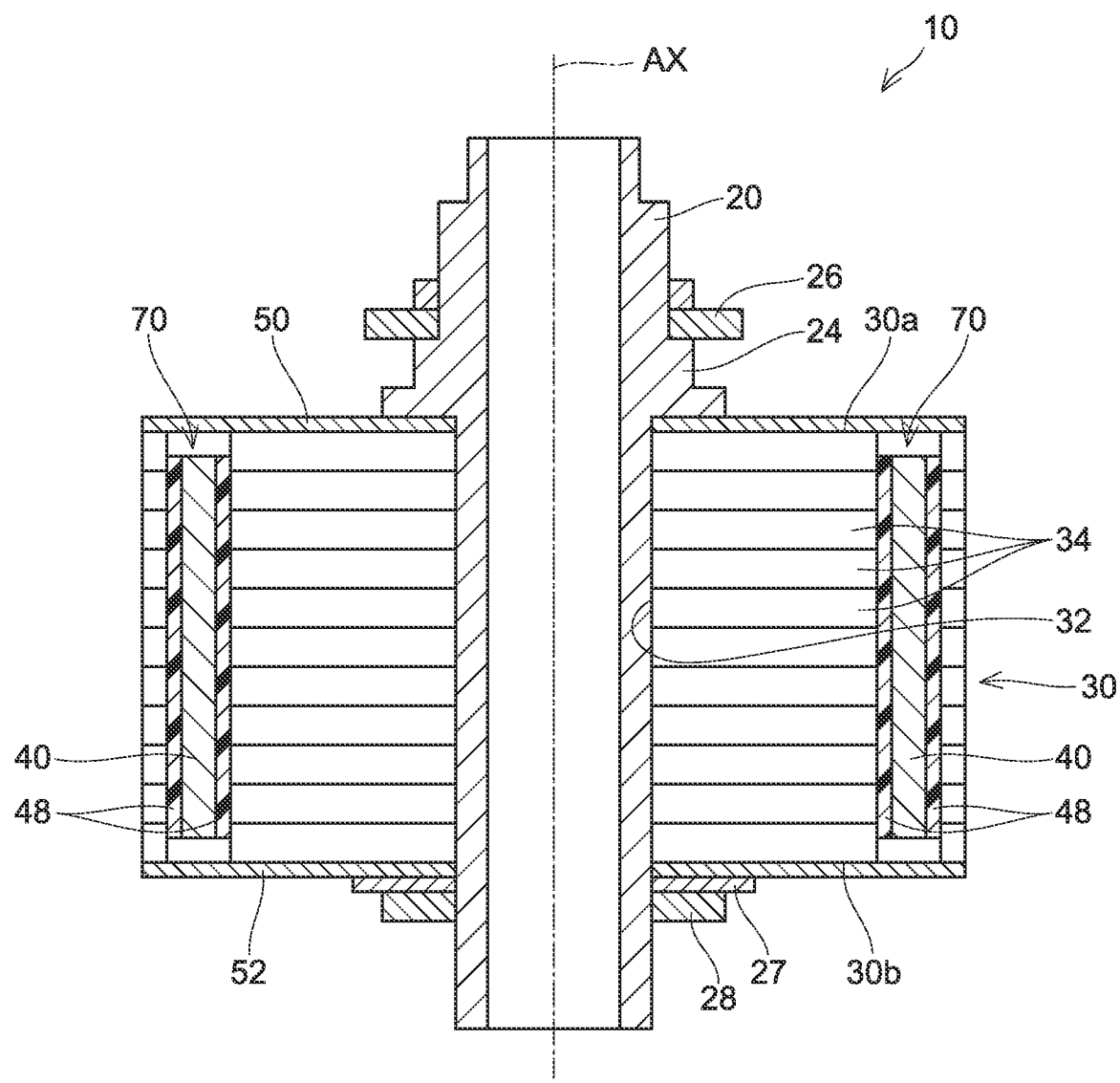
FIG. 2 is a cross-sectional view of the rotor 10 along a plane including a center axis AX.

The shaft 20 is constituted of a metal material (such as carbon steel, specialty steel, and non-magnetic metal such as aluminum and stainless steel). The shaft 20 has a cylindrical shape. As shown in FIGS. 1 and 2, a flange 24 protrudes out from an outer circumferential surface of the shaft 20. A resolver 26 is attached to the outer circumferential surface of the shaft 20. The resolver 26 is arranged at a position adjacent to the flange 24. The resolver 26 is configured to detect a rotary angle of the rotor 10.

Figure 3:
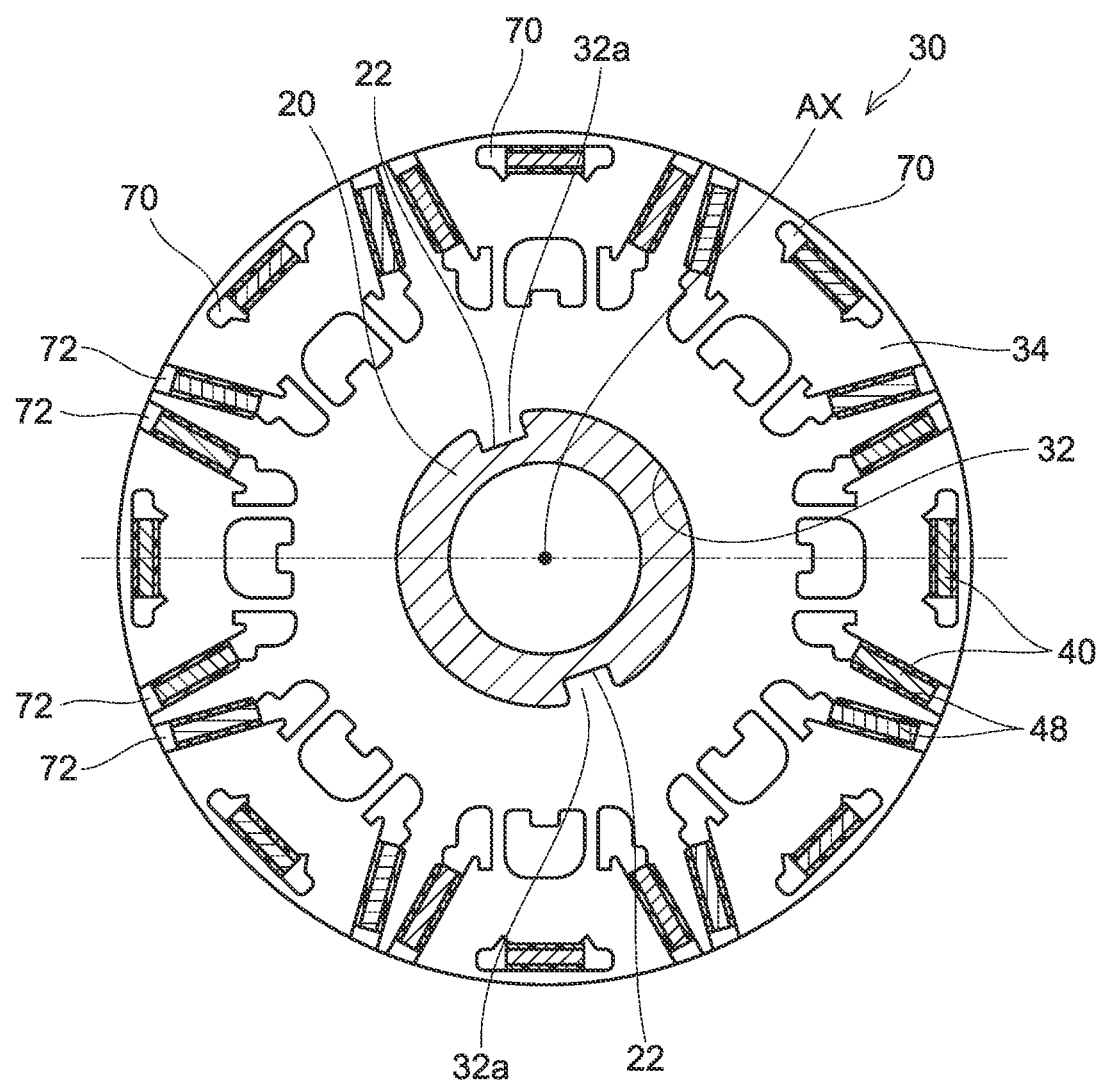
FIG. 3 is a cross-sectional view of the rotor 10 along a plane perpendicularly intersecting the center axis AX.

As shown in FIGS. 1 and 2, the rotor core 30 is a laminate in which a plurality of electromagnetic steel plates 34 is laminated. As shown in FIG. 3, each of the electromagnetic steel plates 34 has a disk ring shape. The cylindrical rotor core 30 is configured by having the plurality of disk ring-shaped electromagnetic steel plates 34 laminated on each other. As shown in FIGS. 1 and 2, the rotor core 30 has end surfaces 30a, 30b on its both sides in its axial direction.

The first end plate 50 is constituted of a metal material (such as non-magnetic metal such as aluminum and stainless steel). As shown in FIGS. 1 and 2, the first end plate 50 has a disk ring shape. The first end plate 50 covers the end surface 30a of the rotor core 30. The first end plate 50 is arranged concentric with the rotor core 30. The first end plate 50 is fixed to the end surface 30a of the rotor core 30 by welding.

The second end plate 52 is constituted of a metal material (such as non-magnetic metal such as aluminum and stainless steel). The second end plate 52 is fixed to the end surface 30b of the rotor core 30 by welding. The second end plate 52 has a disk ring shape. The second end plate 52 covers the end surface 30b of the rotor core 30. The second end plate 52 is arranged concentric with the rotor core 30.

As shown in FIGS. 1 to 3, the shaft 20 is inserted into a center hole 32 of the first end plate 50, the rotor core 30, and the second end plate 52. A center axis of the shaft 20 coincides with the center axis AX of the rotor core 30. The first end plate 50 abuts the flange 24. A washer 27 and a nut 28 are arranged on an opposite side from the flange 24. The washer 27 abuts the second end plate 52. The first end plate 50, the rotor core 30, and the second end plate 52 are interposed between the flange 24 and the nut 28. Due to this, the first end plate 50, the rotor core 30, and the second end plate 52 are fixed to the shaft 20.

As shown in FIG. 3, two fixing trenches 22 are defined on the outer circumferential surface of a portion of the shaft 20 that is inserted into the rotor core 30. The two fixing trenches 22 extend along a longitudinal direction of the shaft 20. Two projections 32a are provided on an inner surface of the center hole 32 of the rotor core 30. The shaft 20 is inserted into the center hole 32 of the rotor core 30 such that the projections 32a engage with the fixing trenches 22. Due to this, the shaft 20 is suppressed from rotating relative to the rotor core 30.

Figure 4:
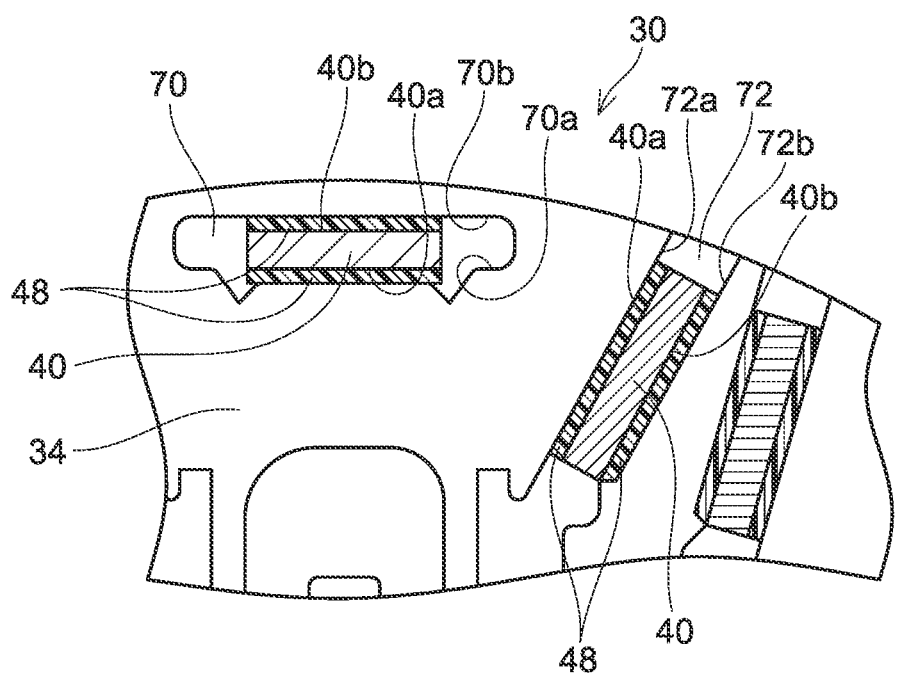
FIG. 4 is an enlarged cross-sectional view of a through hole 70 and trenches 72 along the plane perpendicularly intersecting the center axis AX.

As shown in FIGS. 2 and 3, a plurality of through holes 70 is defined in the rotor core 30. Each of the through holes 70 extends in a direction parallel to the center axis AX of the rotor core 30. That is, each of the through holes 70 extends in a lamination direction of the electromagnetic steel plates 34. Each of the through holes 70 is configured by through holes defined in the respective electromagnetic steel plates 34 communicating with each other. As shown in FIG. 2, each of the through holes 70 penetrates the rotor core 30. That is, the through holes 70 all extend from the end surface 30a to the end surface 30b. Respective ends of each through hole 70 are closed by the first end plate 50 and the second end plate 52. As shown in FIG. 3, in a cross section perpendicular to the center axis AX, each of the through holes 70 has a flat cross-sectional shape. As shown in FIG. 4, two surfaces with wider widths (surfaces facing each other) among inner surfaces of each through hole 70 will herein be termed inner surfaces 70a, 70b.

As shown in FIGS. 1 and 3, a plurality of trenches 72 is defined on an outer circumferential surface of the rotor core 30. Each of the trenches 72 extends in the direction parallel to the center axis AX of the rotor core 30. That is, each of the trenches 72 extends in the lamination direction of the electromagnetic steel plates 34. Each of the trenches 72 is configured by cutout portions defined in the respective electromagnetic steel plates 34 communicating with each other. As shown in FIG. 1, the trenches 72 all extend from the end surface 30a to the end surface 30b. Respective ends of each trench 72 are closed by the first end plate 50 and the second end plate 52. As shown in FIG. 4, two surfaces facing each other among inner surfaces of each trench 72 will be termed inner surfaces 72a, 72b.

As shown in FIGS. 2 to 4, a magnet 40 and resin sheets 48 are arranged inside each of the through holes 70 and the trenches 72.

The magnets 40 are permanent magnets. Neodymium magnets, alnico magnets, ferrite magnets, samarium-cobalt magnets, praseodymium magnets, samarium-iron nitride magnets, platinum magnets, and/or cerium cobalt magnets may be used as the magnets 40, for example. As shown in FIG. 2, each of the magnets 40 has a shape elongated in the direction parallel to the center axis AX of the rotor core 30. Further, as shown in FIGS. 3 and 4, each of the magnets 40 has a cross-sectional shape that is flat in a cross section perpendicular to the center axis AX. As shown in FIG. 4, each of the magnets 40 has wide-width surfaces 40a, 40b. The wide-width surface 40a is located on an opposite side from the wide-width surface 40b. Inside each through hole 70, the wide-width surface 40a of the magnet 40 faces the inner surface 70a of the through hole 70, and the wide-width surface 40b of the magnet 40 faces the inner surface 70b of the through hole 70. Inside each trench 72, the wide-width surface 40a of the magnet 40 faces the inner surface 72a of the trench 72, and the wide-width surface 40b of the magnet 40 faces the inner surface 72b of the trench 72.

The resin sheets 48 are constituted of a material including a thermoplastic. A material having a high grass transition temperature (Tg) may be used as the thermoplastic of the resin sheets 48. Further, a material having high electric insulation, water resistance, oil resistance, creep resistance, and thermal shock resistance may be used as the thermoplastic of the resin sheets 48. Moreover, the thermoplastic of the resin sheets 48 may be crystalline or amorphous. For example, polyether imide (Tg=217° C.), polyether sulphone (Tg=230° C.), or polysulphone (Tg=90° C.) may be used as the thermoplastic of the resin sheets 48. As shown in FIG. 4, in each of the through holes 70, the resin sheets 48 are each arranged between the wide-width surface 40a of the magnet 40 and the inner surface 70a of the through hole 70 and between the wide-width surface 40b of the magnet 40 and the inner surface 70b of the through hole 70. The resin sheets 48 adhere the magnet 40 onto the inner surfaces 70a. 70b. In each of the trenches 72, the resin sheets 48 are each arranged between the wide-width surface 40a of the magnet 40 and the inner surface 72a of the trench 72 and between the wide-width surface 40b of the magnet 40 and the inner surface 72b of the trench 72. The resin sheets 48 adhere the magnet 40 onto the inner surfaces 72a, 72b. As above, the magnets 40 are fixed inside the through holes 70 and inside the trenches 72 by the resin sheets 48.

Figure 5:
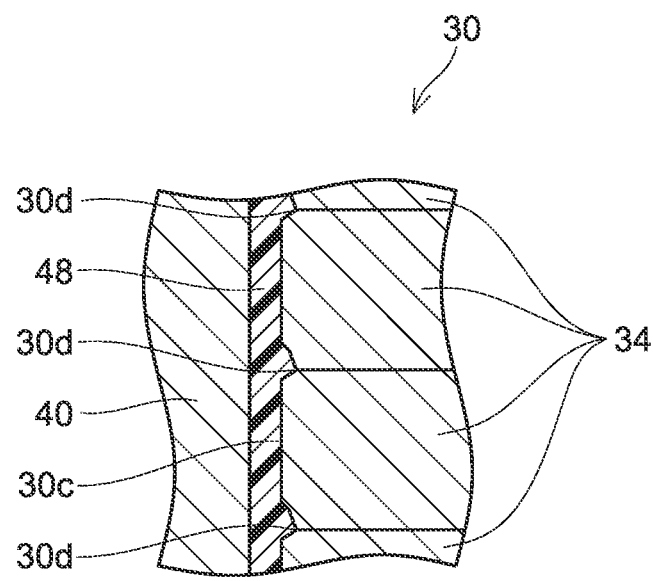
FIG. 5 is an enlarged cross-sectional view of a magnet 40 and border portions of a rotor core 30.

FIG. 5 shows an enlarged view of an adhering region of the magnet 40 and the rotor core 30. A surface 30c of the rotor core 30 in FIG. 5 represents each of the inner surfaces 70a, 70b of the through holes 70 and the inner surfaces 72a, 72b of the trenches 72. As shown in FIG. 5, concave portions 30d respectively extending along borders of the laminated electromagnetic steel plates 34 are defined on the surface 30c of the rotor core 30. Since all the electromagnetic steel plates 34 are fabricated by shear pressing, very small, tilted portions are formed on end surfaces of each electromagnetic steel plate 34. As such, the surface 30c of the rotor core 30 being the laminate of the plurality of electromagnetic steel plates 34 results in having the concave portions 30d extending along the borders between the electromagnetic steel plates 34. The thermoplastic constituting the resin sheets 48 is filled inside these concave portions 30d without voids.

Next, a manufacturing method of the rotor 10 will be described. Firstly, the rotor core 30 is formed by laminating the plurality of electromagnetic steel plates 34 and fixing the laminated electromagnetic steel plates 34 to each other. Next, the magnets 40 and the resin sheets 48 are inserted into the respective through holes 70 and trenches 72 of the rotor core 30. The unused resin sheets 48 are sheet-shaped members with the thermoplastic as their primary material, and have a characteristic of expanding when heat is applied. Resin sheets in which compressed glass fibers (so-called fillers) are scaled with a thermoplastic may be used as the resin sheets 48. When this type of resin sheets is heated, stress on the compressed glass fibers is released when the thermoplastic softens, and the glass fibers thereby expand. Due to this, the resin sheets expand. Further, members in which a foaming agent (such as foaming capsules) is dispersed in a thermoplastic may be used as the resin sheets 48. When this type of resin sheets is heated, the thermoplastic softens, and the foaming agent gasifies. As a result, the resin sheets foam and expand. Here, as shown in FIG. 4, the magnets 40 and the resin sheets 48 are inserted into the through holes 70, respectively such that the resin sheets 48 are each arranged between the wide-width surface 40a of the magnet 40 and the inner surface 70a of the through hole 70 and between the wide-width surface 40b of the magnet 40 and the inner surface 70b of the through hole 70. Further, as shown in FIG. 4, the magnets 40 and the resin sheets 48 are inserted into the trenches 72, respectively such that the resin sheets 48 are each arranged between the wide-width surface 40a of the magnet 40 and the inner surface 72a of the trench 72 and between the wide-width surface 40b of the magnet 40 and the inner surface 72b of the trench 72.

Figure 6:
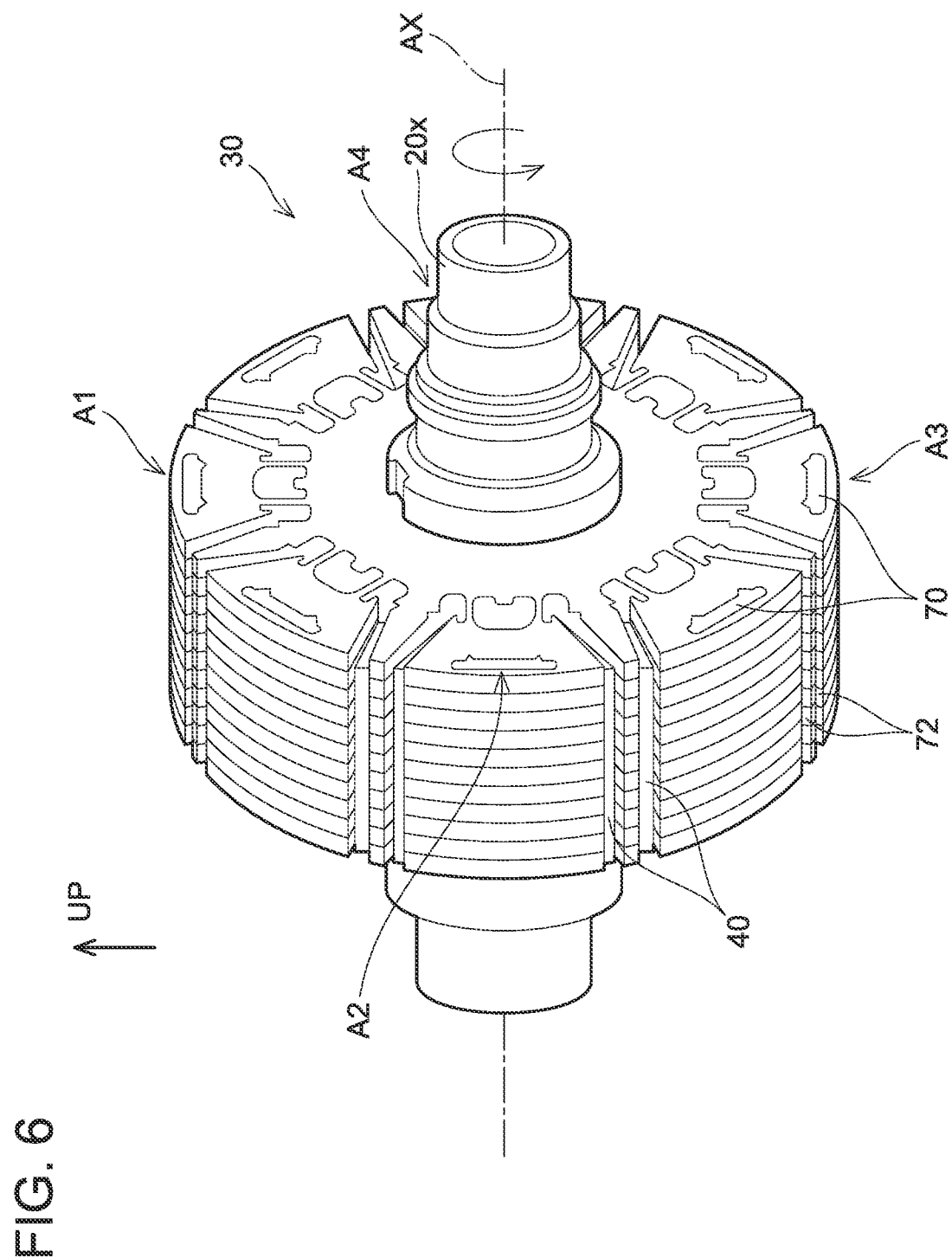
FIG. 6 is a perspective view of the rotor core 30 in heating and cooling steps.

Next, as shown in FIG. 6, the rotor core 30 in a state of having the magnets 40 and the resin sheets 48 installed therein is fixed to a shaft 20x. The shaft 20x may be the shaft 20 shown in FIG. 1 (that is, the shaft being a component of the rotor 10) or may be a shaft provided on a jig used in this manufacturing process. Next, as shown in FIG. 6, the shaft 20x is rotated in a state of having the shaft 20x intersecting a vertical direction. In FIG. 6, an arrow UP indicates a vertically upward direction. When the shaft 20x is rotated as described above, the rotor core 30 rotates around the center axis AX in a state where the center axis AX of the rotor core 30 intersects the vertical direction. In this embodiment, the rotor core 30 is rotated around the center axis AX in a state of having the center axis AX of the rotor core 30 arranged horizontally. Here, the rotor core 30 is rotated at relatively low speed of about 1 to 5 rpm. At this rotary speed, centrifugal force applied to the respective resin sheets 48 is smaller than gravitational force. The state in which the rotor core 30 is rotating around the center axis AX in the state where the center axis AX intersects the vertical direction is maintained until a heating step and a cooling step to be described later are completed.

Next, the heating step of heating the rotor core 30 is carried out. In the heating step, the resin sheets 48 are heated together with the rotor core 30 while rotating the rotor core 30, as shown in FIG. 6. As a result, the thermoplastic in the resin sheets 48 softens and the resin sheets 48 expand. That is, a thickness of the resin sheets 48 increases. Thus, the thermoplastic in each of the resin sheets 48 is pressurized toward its corresponding magnet 40 and the rotor core 30. In the heating step, the rotor core 30 and the resin sheets 48 are maintained at a temperature higher than a softening temperature of the thermoplastic included in the resin sheets 48 over a predetermined time. Since the rotor core 30 is rotating around the center axis AX that intersects the vertical direction, a direction of gravity applied to the thermoplastic softening during the heating step thereby changes. For example, for the resin sheets 48 that are present at a position A1 above the center axis AX, the gravity acts thereon toward a center axis AX side. Further, for the resin sheets 48 that are present at a position A3 below the center axis AX, the gravity acts thereon toward a radially outer side of the rotor core 30. Further, for the resin sheets 48 that are present at a position A2 horizontal to the center axis AX, the gravity acts thereon toward a circumferential direction (rotation direction). Further, for the resin sheets 48 that are present at a position A4 horizontal to the center axis AX, the gravity acts thereon toward a circumferential direction (in a reversed direction from the rotation direction). Since the direction of the gravity applied to the thermoplastic changes as above, the thermoplastic flows in a complicated pattern in a region between each of the magnets 40 and the rotor core 30. Due to this, the thermoplastic can be applied evenly on the surfaces of the magnets 40 and the surface of the rotor core 30. As a result, adhesion of the thermoplastic onto the magnets 40 and the rotor core 30 can be improved. Especially due to the changes as above in the direction of the gravity applied to the softened thermoplastic, the thermoplastic can be applied thoroughly within the concave portions 30d on the surface 30c of the rotor core 30 as shown in FIG. 5. Thus, the thermoplastic can be adhered firmly on inner surfaces of the respective concave portions 30d.

In the heating step, the rotor core 30 and the resin sheets 48 may be maintained at a temperature lower than a temperature that is 50° C. higher than the softening temperature of the thermoplastic. By controlling the heating temperature as above, viscosity of the thermoplastic can be suppressed from significantly decreasing. Due to this, the softened thermoplastic can be suppressed from dripping off of the rotor core 30.

Next, the cooling step of cooling the rotor core 30 will be described. In the cooling step, the rotor core 30 and the resin sheets 48 are cooled to a normal temperature while rotating the rotor core 30 as shown in FIG. 6. By doing so, the thermoplastic solidifies. Due to this, the magnets 40 are adhered onto the rotor core 30 by the resin sheets 48. Since the cooling step is carried out while rotating the rotor core 30, the thermoplastic solidifies in a state of being firmly adhered to both the magnets 40 and the rotor core 30. Thus, the magnets 40 can firmly be glued onto the rotor core 30 by the thermoplastic. Further, as shown in FIG. 5, the thermoplastic solidifies in a state of being filled in the concave portions 30d on the surface of the rotor core 30. Due to this, the thermoplastic is even more firmly adhered onto the rotor core 30 by an anchoring effect.

Next, as shown in FIG. 1, the rotor core 30 having undergone the cooling step is attached to the shaft 20 along with the first end plate 50 and the second end plate 52. The rotor 10 shown in FIG. 1 is thereby completed.

As described above, according to the manufacturing method of the present embodiment, the magnets 40 can be firmly connected to the rotor core 30 by the thermoplastic of the resin sheets 48. Thus, the rotor 10 capable of enduring high-speed rotation can be manufactured.

In the above embodiment, the magnets 40 are glued to the rotor core 30 using the resin sheets 48, however, an adhering member having the thermoplastic may have other configurations.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A manufacturing method of a rotor, the method comprising:

arranging a magnet and a thermoplastic in a magnet fixing portion of a rotor core comprising a laminate in which a plurality of metal plates is laminated, wherein concave portions extending along borders between the plurality of metal plates are defined on an inner surface of the magnet fixing portion, the magnet fixing portion comprising one or more of a hole, a trench, or a hole and a trench that are provided in the rotor core and extending along a lamination direction of the laminate;

heating the rotor core while rotating the rotor core around a center axis of the rotor core with the center axis intersecting a vertical direction; and cooling the rotor core to fix the magnet to the rotor core via the thermoplastic while rotating the rotor core around the center axis with the center axis intersecting the vertical direction.

2. The manufacturing method of claim 1, wherein, in the heating of the rotor core, a temperature of the rotor core is controlled to be higher than a softening temperature of the thermoplastic.

3. The manufacturing method of claim 2, wherein, in the heating of the rotor core, the temperature of the rotor core is controlled to be lower than a temperature 50 degrees Celsius higher than the softening temperature of the thermoplastic.

* * * * *